April 13, 1965    S. H. BROWN ETAL    3,177,585
COORDINATE POSITIONING AND MEASURING APPARATUS
Filed May 31, 1961
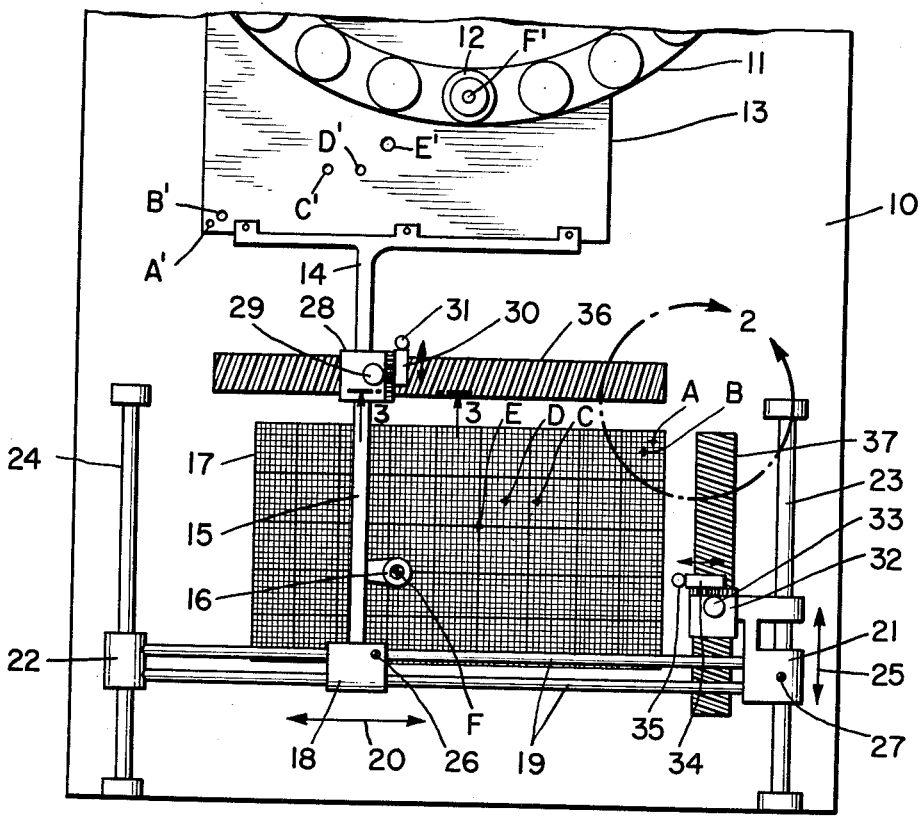
FIG.1.
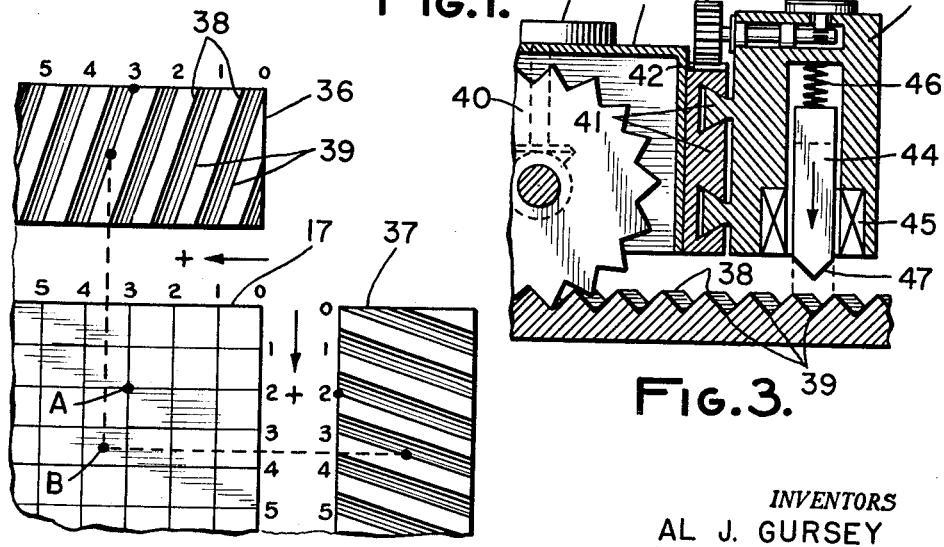
FIG.2.
FIG.3.
INVENTORS
AL J. GURSEY
BY SMITH H. BROWN
Elliott & Pastoriza
ATTORNEYS

UNITED STATES PATENT OFFICE

3,177,585
COORDINATE POSITIONING AND MEASURING APPARATUS
Smith H. Brown, 10328 Lesterford St., Downey, Calif., and Al J. Gursey, 271 S. Mapleton Drive, Los Angeles 24, Calif.
Filed May 31, 1961, Ser. No. 113,793
4 Claims. (Cl. 33—1)

This invention relates to a novel coordinate positioning and measuring apparatus particularly useful in machining operations.

In manufacturing, it is conventional practice to first provide an overall master mechanical drawing of the particular part including all dimensions, such as center-to-center spacing between drill holes, diameters of the holes, etc. This original master drawing is usually on vellum type paper so that blueprints may be reproduced therefrom in large numbers.

From the blueprints, the machinist then constructs a template or master workpiece from which duplicates may readily be made. For example, the machinist will transfer the dimensions from the blueprints to a suitable workpiece and then perform the indicated machining operations thereon. This workpiece then becomes a template, and the various machining operations thereon may themselves be employed to effect subsequent positioning of the machine tool for making additional pieces.

The foregoing procedure is time consuming and subject to errors. For example, the reproduction of the blueprints and the setting up of the machine in accordance with the dimensions on the blueprints are time-consuming operations. In the latter case, there is room for error in the mental transfer and manual setting of the dimensions in the actual machine tool. Finally, there is involved the entire operation of forming a template from which subsequent pieces may be machined.

With the foregoing in mind, it is a primary object of this invention to provide a novel positioning and measuring apparatus, particularly adapted for forming machined parts directly from a master plan so that the production of blueprints, transfer of dimensions, and formation of a master template are no longer necessary.

More particularly, it is an object to provide an apparatus in which the desired number of workpieces or parts may be made directly from a master plan even though actual written dimensions do not appear on the plan.

A more general object is to provide a novel machine tool positioning apparatus which will enable rapid and accurate positioning of a work relative to a machine tool in accordance with a master plan with no intermediary steps necessary beyond the simple location of a point on the master plan by the positioning apparatus.

Another important object is to provide a positioning apparatus which will enable the rapid and accurate positioning of a work or machine in accordance with given coordinates and fractions of a coordinate.

A specific object of the invention is to provide a novel coordinate positioning and measuring apparatus accurate to one ten-thousandth of an inch.

Briefly, these and other objects and advantages of this invention are attained by providing a pair of racks fixed at right angles to each other with first longitudinal edges parallel to horizontal and vertical coordinate axes, respectively. The racks include teeth extending transversely thereacross at a slant with respect to the longitudinal axes so that the teeth of the racks terminate on second longitudinal edges spaced at least one coordinate point ahead of the coordinate points coorresponding to their starting points. By this arrangement, intermediate portions of the teeth between the longitudinal edges of the racks will serve to designate fractional coordinate points to the end that a positioning means indexed to the horizontal and vertical racks may be positioned at any desired coordinate points as well as at fractions of a coordinate point.

With the foregoing structure, a workpiece may be secured to the positioning means and similarly indexed in accordance with the racks so that even fractions of coordinates may be designated and a work accordingly positioned. By providing a master plan in the form of a grid pattern properly aligned with the horizontal and vertical rack teeth, points on the grid pattern may be transferred directly to the work through the medium of the positioning apparatus even in the absence of dimensions written on the master plan.

A better understanding of the invention will be had by now referring to one embodiment as schematically illustrated in the accompanying drawings, in which:

FIGURE 1 is a highly schematic top plan view of the coordinate positioning and measuring apparatus of this invention;

FIGURE 2 is a greatly enlarged fragmentary view of that portion enclosed within the circular arrow 2 of FIGURE 1; and FIGURE 3 is a fragmentary cross section of a portion of the structure taken in the direction of the arrows 3—3 of FIGURE 1.

Referring first to FIGURE 1, there is shown by way of example of one use of the invention, a work table 10 for a punching machine turret 11 having a plurality of punches of selectable diameter one of which is positioned for operation as indicated at 12.

In the particular example chosen for illustrative purposes, it is assumed that a workpiece in the form of a flat sheet of metal 13 is to be punched by the tool 12 at various points at specific coordinate distances from the lower horizontal and left vertical edges of the metal plate 13.

The plate or work 13 is secured in a holder 14 constituting part of a positioning means including an elongated rod 15 and manually movable indicator or pointer 16. As shown, the manually movable pointer 16 is positioned over a grid pattern 17 which may constitute a master drawing including points lettered at A, B, C, D, E, and F corresponding to the desired points to be punched out on the work sheet 13. These latter points are indicated by the same letters followed by a prime.

The positioning means which includes the holder 14, rod 15, and pointer 16 is arranged for both horizontal and vertical movement over the grid pattern 17. This is achieved by mounting the positioning means on a carriage 18 slidable on horizontal rails 19 in either left or righthand directions as indicated by the double-headed arrow 20. The horizontal rails 19 in turn terminate at their right and left ends, respectively, in vertically movable carriages 21 and 22 arranged to slide on vertical rails 23 and 24 in vertical up and down directions as viewed in FIGURE 1 and as indicated by the double-headed arrow 25.

In some instances, it may only be necessary to successively position the work 13 along spaced vertical points and to facilitate this positioning, the horizontal carriage 18 may be locked by a set screw 26 to the horizontal rails 19 to prevent horizontal movement of the pointer 16 and work 13. Similarly, if a series of operations are to be effected along a horizontal row, vertical movement of the positioning means may be locked by tightening a set screw 27 associated with the vertical carriage 21.

In order to properly index the positioning means, there is provided a horizontal indexing structure coupled to the positioning means and including a carriage structure 28 having a counter 29 mounted thereon and an indexing means 30 carried by the structure 28 provided with a counter 31. As will become clearer as the description proceeds, the indexing means 30 is mounted for transverse movement to the carriage 29, the carriage 29 itself being mounted for horizontal movement. Similarly, there is provided a carriage 32 coupled to the positioning means through the medium of the carriage 21 and horizontal rails 19 and including a counter 33, indexing means 34, and associated counter 35. As in the case of the indexing means 30, the indexing means 34 is mounted for transverse movement to the carriage 32.

Cooperating with the indexing means are horizontal and vertical racks 36 and 37. These racks are stationarily secured to the table 10 and each is provided with slanted teeth as shown. The arrangement is such that the carriages 28 and 32 are respectively geared to the racks to move therealong in horizontal and vertical directions, respectively, as the positioning means is moved horizontally and vertically. For example, the rod 15 is longitudinally slidable within of the positioning means so that vertical motion of this rod will not affect the carriage 28. However, horizontal movement of the rod 15 will serve to move the horizontal carriage 28.

With particular reference to the enlarged fragmentary view of FIGURE 2, it will be noted that the racks 36 and 37 are identical in construction except that one is oriented horizontally and the other vertically. Therefore, description of one will suffice for both. Thus, with reference to the horizontal rack 36, there are provided a plurality of teeth 38 which extend from the upper longitudinal edge transversely across the width of the rack to terminate in the lower longitudinal edge. The termination points are spaced at least one coordinate point ahead of the coordinate points corresponding to the starting points of the various teeth 38 on the first or upper longitudinal edge. For example, on the first longitudinal upper edge of the rack 36, the starting coordinate points are designated by the numerals 0, 1, 2, 3, 4, 5, etc. The point at which the teeth 38 terminate at the lower or second longitudinal edge, if projected vertically upwardly, are seen to be advanced by at least one coordinate point.

The teeth in the vertical rack 37 are similarly arranged, the lefthand longitudinal edge of the rack 37 constituting a first longitudinal edge at which the teeth originate, thence extend transversely across the rack 37 at a slant with respect to the first longitudinal edge to terminate at the second longitudinal edge at least one coordinate or tooth width ahead of the initial starting point.

Between each of the teeth, there are defined troughs 39 and the initial and end points of the troughs on the first and second longitudinal edges of the rack are made to fall in exact alignment with the rectangular grid network of the grid pattern 17 as illustrated in FIGURE 2. Thus, the points 0, 1, 2, 3, 4, and 5 indicating the initial starting points of the troughs 39 on the first longitudinal edge of the rack 36 fall in exact vertical alignment with the coordinates 0, 1, 2, 3, 4, and 5 of the grid 17. The upper righthand corner of the grid pattern 17 is taken as 0. Similarly, the initiation point of the slanted troughs of the rack 37 along the first longitudinal edge corresponding to the lefthand edge of the rack coincide in horizontal alignment with the coordinates 0, 1, 2, 3, 4, and 5 extending downwardly on the grid 17.

It will be evident that any given point on the grid 17 such as A having coordinates may be matched with 3, 2 and corresponding points 3 and 2 along the first longitudinal edges of the racks as shown. It will also be evident that any fractional coordinate point such as point B on the grid 17 which may be designated by the coordinates 3.5, 3.5 will find counterparts to its coordinates at intermediate tooth portions between the first and second longitudinal edges of the rack.

Referring now to FIGURE 3, the manner in which the positioning means is properly indexed by the indexing means and carriages therefor will become clear. Since both the horizontal and vertical indexing means and carriages are identical, description of one will suffice for both. Referring to the carriage 28 and indexing means 30 transversely mounted thereto, it will be noted in FIGURE 3 that the carriage itself incorporates a gear wheel 40 which is in mesh with the teeth 39 of the rack 36. As the carriage 28 moves from right to left, the gear wheel 40 will be rotated to operate the counter 29 and thus provide a visual indication of the number of teeth traversed. This indication will provide a direct reading of a horizontal coordinate. The carriage 32 associated with the vertical rack 37 similarly incorporates a gear wheel which will operate the counter 33 to provide a numerical value corresponding to a vertical coordinate.

The indexing means 30 in turn is mounted to the carriage 28 for transverse movement as by cooperating dovetailed slides 41. The carriage 28 in addition includes a transverse rack 42 cooperating with a pinion gear 43 connected to the counter 31. Transverse movement of the indexing means 30 along the width dimension of the racks will thus be indicated by the counter 31.

The indexing means 30 includes a pawl 44 arranged to be pulled downwardly by electromagnetic coils 45 and retracted upon de-energization of the coils by a spring 46. When lowered, the extreme end 47 of the pawl 46 will index between adjacent teeth or within one of the troughs of the rack disposed thereunder. Since the pawl moves across the width of the rack with the indexing means, the pawl may be arranged to engage intermediate tooth portions between the first and second longitudinal edges of the racks so that in so indexing these tooth portions the carriage may be moved by a fratcion of a coordinate point.

The indexing means 34 and counter 35 coupled to the carriage 32 for the vertical rack 37 includes identical components.

From the foregoing description, the overall operation of the device will become evident. Assuming it is desired to punch holes at the exact locations as the lettered points A, B, C, D, E, and F shown on the master grid plan 17, the master grid is secured as by masking tape to the table 10 in a position such that its grid is in correspondence with the initial starting points of the gear teeth along the first and second longitudinal edges of the racks 36 and 37 as described in conjunction with FIGURE 2. Next, the workpiece 13 is secured to the holder 14 in a position with reference to the punch 12 corresponding to the position of the pointer 16 with reference to the grid 17. For example, when the pointer 16 is above the upper righthand corner of the grid, the punch 12 is above the lower lefthand corner of the work 13.

The operator may then grasp the pointer 16 and move the entire positioning means which includes the rod 15 and holder 14 such that the indicator 16 will fall approximately over the holes to be formed. This movement will position a corresponding point on the workpiece 13 under the punch 12. The operator may then depress a suitable button to energize the electromagnetic coils in the indexing means to operate the vertical, movable indexing pawls described in FIGURE 3. The pawls will then be lowered and will index between the teeth to exactly position the positioning structure at the desired point. Thus, guesswork on the part of the operator is eliminated, and it is only required that he position the indicator within one-half of the grid distance between coordinates in both horizontal and vertical directions of the exact point. For example, if the point A falls directly on the coordinate points 3, 2 as shown in FIGURE 2 and the operator positions the indicator point 16 closer to the intersection of the coordinate axes 3 and 2 than to any of the other intersections, depression of the energizing button for the coils will result in the indexing pawls such as 44 indexing directly to the intersection of 3 and 2.

If a next hole is to be punched at a point such as the point B intermediate an exact coordinate cross-over point, the operator first causes transverse movement of the indexing means to take place with respect to the various horizontal and vertical carriages so that the pawl instead of engaging along the first longitudinal edges of the racks engage central portions of the racks. As a consequence of the slant of the teeth, this operation will cause positioning of the positioning means to be indexed at fractional coordinate points such as 3.5 and 3.5 for the point B as shown in FIGURE 2.

If the small squares in the grid 17 of FIGURE 2 are each 1/10th of an inch on a side, then the operator need only manually position the indicator within 1/20th of an inch of the point to avoid any ambiguity upon operating the indexing pawls such as the pawl 44. Where specific dimensions are provided, the positioning means may be positioned by simply observing the counters 29 and 33. To obtain fractional positions, the transverse mountings for the indexing means 30 and 34 are moved transversely across the respective tracks. The small counters 31 and 34 will respectively indicate this movement through the medium of the pinion gear 43 and transverse rack 42, for example, as described in FIGURE 3 for the horizontal rack 46. Complete transverse movement from one longitudinal edge to the other will effect movement of 1/10th of an inch or one coordinate, and any intermediate point between the longitudinal edges at which the indexing means is stopped will constitute a fraction which may be indicated by the counter associated therewith. This counter may be calibrated to read one part in a thousand so that positioning within one ten-thousandth of an inch may be realized.

It will be understood, as noted heretofore, that since the workpiece 13 is secured directly to the positioning means 14, 15, and 16 and since the turret 11 and punching tool 12 is stationary with respect to the master grid 17, the points on the workpiece 13 corresponding to the points on the pattern 17 will be measured from opposite edges. Thus, the points corresponding to A and B on the upper righthand corner of the grid pattern 17 will appear in the lower lefthand corner of the workpiece 13. Alternatively, if the tool were movable and supported by the holder 14 and the workpiece 13 held stationary to the table 10, coordinate positions would be measured from corresponding edges of the master grid plan and the workpiece.

After the workpiece is machined in accordance with the master grid pattern 17, it may be used as a template for future formation of workpieces. On the other hand, it is as simple and rapid for an operator to continue to work from the grid pattern 17 to form as many pieces as required so that the actual formation of a template is avoided.

From the foregoing, it will also be evident that reproduction of blueprints and transferring of dimensions may be avoided. In other words, it is not necessary for a person to read dimensions from a blueprint and transfer these dimensions to the conventional machine adjustments to set up proper positioning of the machine. In accordance with the present invention, this is all effected automatically by the operator simply positioning the indicator pointer 16 directly to the particular location of the grid pattern 17 and then through the novel positioning and indexing coordinate means described, insuring an exact positioning with respect to this particular point.

While only one particular embodiment of this invention has been shown and described in conjunction with a particular punching operation, it will be evident that many other applications and uses for the coordinate positioning and measuring appaartus of this invention will occur to those skilled in the art. The invention is therefore not to be thought of as limited to the one example set forth for illustrative purposes.

What is claimed is:

1. A coordinate positioning and measuring apparatus for enabling the machining of a work in accordance with coordinate points reference to horizontal and vertical coordinate axes on a given grid pattern comprising, in combination: positioning means for positioning said work, said positioning means being movable in both horizontal and vertical directions corresponding to the directions of said coordinate axes, respectively; measuring means including fixed horizontal and vertical racks having teeth spaced in accordance with said coordinates along first longitudinal edges of said racks parallel to said coordinate axes, said teeth extending across the width of the racks at a slant with respect to first longitudinal edges to terminate on second longitudinal edges of said racks in positions spaced at least one coordinate point ahead of the coordinate point demarking the starting points of the teeth along said first longitudinal edges so that teeth portions intermediate said first and second longitudinal edges define points between adjacent coordinates; horizontal and vertical indexing means coupled to said positioning means for respective horizontal and vertical movement along said first longitudinal edges of said horizontal and vertical racks, and for transverse movement between said first and second longitudinal edges; and means to actuate said indexing means to engage portions of said teeth in said racks whereby said positioning means may be indexed to specific coordinates and fractions of coordinates on said grid pattern by said indexing means to effect a corresponding positioning of said work.

2. An apparatus according to claim 1, including counter means connected to said indexing means for visually indicating the coordinates denoting the position of said positioning means.

3. An apparatus according to claim 2, in which said counter means comprises gear wheels engaging said racks, respectively, and connected to counters for indicating the total number of teeth traversed by said indexing means in horizontal and vertical directions, respectively, from given starting points.

4. An apparatus according to claim 3, in which said indexing means each includes a pawl terminating in an end adapted to engage between adjacent teeth on said racks upon downward movement to effect said indexing.

References Cited by the Examiner

UNITED STATES PATENTS

| | | | |
|---|---|---|---|
| 101,689 | 4/70 | Whitmore | 33—143 |
| 1,511,626 | 10/24 | Marino | 33—26 |
| 1,977,213 | 10/34 | Slobey | 33—80 |
| 2,584,267 | 2/52 | Hayek. | |
| 2,862,410 | 12/58 | Meyer | 33—125 X |
| 2,995,826 | 8/61 | Brault | 33—125 X |

FOREIGN PATENTS 852,686  10/60  Great Britain.

ISAAC LISANN, *Primary Examiner.*